(12) United States Patent
Bala et al.

(10) Patent No.: US 10,811,975 B1
(45) Date of Patent: Oct. 20, 2020

(54) THREE-STAGE POWER CONVERTERS FOR ELECTRIC VEHICLE CHARGING

(71) Applicant: ABB Schweiz AG, Baden (CH)

(72) Inventors: Sandeep Bala, Raleigh, NC (US); Jing Xu, Cary, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/388,857

(22) Filed: Apr. 18, 2019

(51) Int. Cl.
| H02M 3/158 | (2006.01) |
| H02M 1/42 | (2007.01) |
| H02M 7/217 | (2006.01) |
| H02M 1/00 | (2006.01) |

(52) U.S. Cl.
CPC ....... H02M 3/1584 (2013.01); H02M 1/4208 (2013.01); H02M 7/2173 (2013.01); H02M 2001/0074 (2013.01)

(58) Field of Classification Search
CPC .... H02M 1/42; H02M 1/4208; H02M 1/4216; H02M 1/4241; H02M 2001/4291; H02M 2001/0074; H02M 3/335; H02M 3/33507; H02M 3/3353; H02M 3/33569; H02M 2007/4811; H02M 2007/4815; H02M 2007/4818; H02M 7/2173
See application file for complete search history.

(56) References Cited

U.S. PATENT DOCUMENTS

| 5,166,869 | A | 11/1992 | Hesterman |
| 5,859,771 | A | 1/1999 | Kniegl |
| 6,111,769 | A | 8/2000 | Zhang |
| 6,490,183 | B2 | 12/2002 | Zhang |
| 7,782,639 | B2 | 8/2010 | Vinciarelli |
| 8,089,788 | B2 | 1/2012 | Jain |
| 9,088,178 | B2 * | 7/2015 | Adest ...................... H02J 3/381 |
| 9,509,225 | B2 | 11/2016 | Stephens et al. |
| 9,931,951 | B2 * | 4/2018 | Khaligh .................... H01F 3/14 |
| 9,998,018 | B2 | 6/2018 | Fu et al. |
| 2011/0007527 | A1 | 1/2011 | Liu |
| 2014/0153294 | A1 | 6/2014 | Deboy |
| 2014/0268907 | A1 | 9/2014 | Cinagrossi |
| 2014/0347005 | A1 * | 11/2014 | Zhou ....................... H02J 7/007 320/107 |
| 2015/0162864 | A1 * | 6/2015 | Moghadas .......... H02M 7/1626 318/504 |

(Continued)

OTHER PUBLICATIONS

Oh, J.S., Lee, G.W., Lee, J.C., Heo, Y.C., Kim, E.S.,,Cook, Y.S.; "An LLC Resonant Converter with a Balanced Load Sharing Capacitor Operating with a Wide Input / Output Voltage Range"; The Korean Institute of Power Electronics; Proceedings of the KIPE Conference; pp. 147-148 (Year: 2017).*

(Continued)

Primary Examiner — Thienvu V Tran
Assistant Examiner — Shahzeb K Ahmad
(74) Attorney, Agent, or Firm — Barnes & Thornburg LLP

(57) ABSTRACT

In at least one illustrative embodiment, a three-stage power converter includes a rectifier having an input to receive three-phase alternating-current (AC) and an output coupled to a first direct-current (DC) bus, a buck converter having an input coupled to the first DC bus and an output coupled to a second DC bus, and an LLC resonant converter having an input coupled to the second DC bus and an output to provide a DC charging current to a battery. The buck converter may be operable across a range of duty cycles to adjust a voltage level supplied to the second DC bus, and the LLC resonant converter may be operable in a plurality of modes to provide a plurality of discrete gain levels.

18 Claims, 6 Drawing Sheets

(56) References Cited

U.S. PATENT DOCUMENTS

| | | | |
|---|---|---|---|
| 2015/0180345 A1* | 6/2015 | Frost | H02M 3/3376 363/17 |
| 2015/0229225 A1 | 8/2015 | Jang | |
| 2016/0016479 A1 | 1/2016 | Khaligh | |
| 2017/0012547 A1 | 1/2017 | Jitaru | |
| 2017/0085183 A1 | 3/2017 | Ntsch | |
| 2018/0138815 A1* | 5/2018 | Yamada | G05F 3/08 |
| 2018/0152112 A1 | 5/2018 | Torrico-Bascope et al. | |
| 2018/0198373 A1 | 7/2018 | Torrico-Bascope et al. | |
| 2018/0234022 A1* | 8/2018 | Ye | H02M 3/33576 |
| 2019/0372465 A1* | 12/2019 | Xu | H02M 7/06 |

OTHER PUBLICATIONS

W. Feng, and F. C. Lee, "Simplified optimal trajectory control (SOTC) for LLC resonant converters." IEEE Trans. on Power Electron., May 2013.

F. Canales, T. H. Li, D. Aggeler, "Novel Modulation Method of a Three-level Isolated Full-Bridge LLC Resonant DC-DC Converter for Wide-Output Voltage Application," in EPE-PEMC 2012 ECCE Europe.

H.-N. Vu and W. Choi, "A Novel Dual Full-Bridge LLC Resonant Converter for CC and CV Charges of Batteries for Electric Vehicles," IEEE Trans. on Ind. Electron., Mar 2018.

J.-B. Lee et. al., "Resonant Capacitor On/Off Control of Half-Bridge LLC Converter for High-Efficiency Server Power Supply," IEEE Trans. on Ind. Electron., Sep. 2016.

C.-O. Yeon et. al., "A New LLC Resonant Converter with Resonant Frequency Change for High Conversion Efficiency and High Power Density," in IFEEC 2017 ECCE Asia.

Jaesung Oh et al., "A 3-Bridge LLC Resonant Converter Operating with a Wide Output Voltage Control Range Using Morphing Control for Mode Transitions", 2019 IEEE Applied Power Electronics Conference and Exposition (APEC), Mar. 2019, 5 pages.

U.S. Department of Energy, "National Plug-IN Electric Vehicle Infrastructure Analysis", Office of Energy Efficiency & Renewable Energy, Sep. 2017, 74 pages.

* cited by examiner

THREE-STAGE POWER CONVERTERS FOR ELECTRIC VEHICLE CHARGING

TECHNICAL FIELD

The present disclosure relates to three-stage power converters, to methods of operating three-stage power converters, and to electrical vehicle charging infrastructure incorporating three-stage power converters.

BACKGROUND

Power modules for electrical vehicle charging infrastructure conventionally use a two-stage architecture, involving an AC-DC boost rectifier followed by an isolated DC-DC converter. The DC bus voltage between these two stages is typically higher than the AC input voltage, which ranges from 380-480 VAC globally, and the isolated DC-DC converter stage typically utilizes soft-switching. Charging stations utilizing such conventional power modules generally produce 20-150 kW of power, with an output voltage range of 200 up to 500, or even up to 750, VDC and an efficiency of over 96%.

It would be desirable for power modules of electrical vehicle charging stations to produce even greater output power, over larger voltage ranges, without sacrificing efficiency or significantly increasing production cost. For instance, new trends show that power levels up to 500 kW and output voltages of up to 1000 VDC would be beneficial to reduce charging time and to provide a more convenient consumer experience.

SUMMARY

According to an aspect of the present disclosure, a three-stage power converter may comprise a rectifier having (i) an input to receive three-phase alternating-current (AC) and (ii) an output coupled to a first direct-current (DC) bus; a buck converter having (i) an input coupled to the first DC bus and (ii) an output coupled to a second DC bus; and an LLC resonant converter having (i) an input coupled to the second DC bus and (ii) an output to provide a DC charging current to a battery, wherein the LLC resonant converter is operable in a plurality of modes to provide a plurality of discrete gain levels.

In some embodiments, the rectifier may comprise a plurality of active devices configured to be switched to convert the three-phase AC into unregulated DC voltage. In some embodiments, the LLC resonant converter may operate at or near its resonant frequency in each of the plurality of modes.

In some embodiments, the plurality of modes of the LLC resonant converter may comprise a first mode in which a first sub-module of the LLC resonant converter operates as a half-bridge converter and a second sub-module of the LLC resonant converter is inactive; a second mode in which the first sub-module of the LLC resonant converter operates as a half-bridge converter and the second sub-module of the LLC resonant converter operates as a half-bridge converter; a third mode in which the first sub-module of the LLC resonant converter operates as a full-bridge converter and the second sub-module of the LLC resonant converter operates as a half-bridge converter; and a fourth mode in which the first sub-module of the LLC resonant converter operates as a full-bridge converter and the second sub-module of the LLC resonant converter operates as a full-bridge converter.

In some embodiments, the LLC resonant converter may be an input-parallel output-series (IPOS) LLC converter. In other embodiments, the LLC resonant converter may be a three-level LLC converter. In some embodiments, the buck converter is operable across a range of duty cycles to adjust a voltage level supplied to the second DC bus by the buck converter.

In some embodiments, the three-stage power converter may further comprise a controller configured to (i) control the LLC resonant converter to operate in a selected one of the plurality of modes and (ii) control a duty cycle of the buck converter based upon the selected mode of the LLC resonant converter and a desired power level for the DC charging current.

According to another aspect of the present disclosure, an electrical vehicle charging station may comprise a rectifier having (i) an input to receive three-phase alternating-current (AC) and (ii) an output coupled to a first direct-current (DC) bus; and a plurality of charging poles. Each of the plurality of charging poles may comprise a buck converter having (i) an input coupled to the first DC bus and (ii) an output coupled to a second DC bus; and an LLC resonant converter having (i) an input coupled to the second DC bus and (ii) an output to provide a DC charging current to a battery, wherein the LLC resonant converter is operable in a plurality of modes to provide a plurality of discrete gain levels.

In some embodiments, the LLC resonant converter of each charging pole may operates at or near its resonant frequency in each of its plurality of modes. In some embodiments, the buck converter of each charging pole may be operable across a range of duty cycles to adjust a voltage level supplied to the second DC bus of that charging pole by the buck converter.

In some embodiments, the electrical vehicle charging station may further comprise one or more controllers configured to (i) control the LLC resonant converter of each charging pole to operate in a selected one of the plurality of modes and (ii) control a duty cycle of the buck converter of each charging pole based upon the selected mode of the LLC resonant converter of that charging pole and a desired power level for the DC charging current to be provided at that charging pole.

According to yet another aspect of the present disclosure, a method of operating a three-stage power converter may comprise rectifying alternating-current (AC) power, using a rectifier of the three-stage power converter, to provide unregulated direct-current (DC) voltage; converting the unregulated DC voltage, using a buck converter of the three-stage power converter, to provide regulated DC voltage; and converting the regulated DC voltage, using an LLC resonant converter of the three-stage power converter operating in a selected one of a plurality of available modes, to provide a DC charging current to a battery, wherein each of the plurality of available modes of the LLC resonant converter provides one of a plurality of discrete gain levels.

In some embodiments, the unregulated DC voltage may have a dominant six pulse ripple. In some embodiments, the LLC resonant converter may operate at or near its resonant frequency in each of the plurality of available modes.

In some embodiments, the plurality of available modes may comprise a first mode in which a first sub-module of the LLC resonant converter operates as a half-bridge converter and a second sub-module of the LLC resonant converter is inactive; a second mode in which the first sub-module of the LLC resonant converter operates as a half-bridge converter and the second sub-module of the LLC resonant converter operates as a half-bridge converter; a third mode in which the first sub-module of the LLC resonant converter operates as a full-bridge converter and the second sub-module of the LLC resonant converter operates as a half-bridge converter; and a fourth mode in which the first sub-module of the LLC resonant converter operates as a full-bridge converter and the second sub-module of the LLC resonant converter operates as a full-bridge converter.

In some embodiments, converting the unregulated DC voltage using the buck converter may comprise controlling a duty cycle of the buck converter based upon the selected mode of the LLC resonant converter and a desired power level for the DC charging current. In some embodiments, the method may further comprise controlling the LLC resonant converter to operate in another of the plurality of available modes to adjust a power level of the DC charging current. In some embodiments, the method may further comprise modifying the duty cycle of the buck converter to further adjust the power level of the DC charging current.

In some embodiments, the method may further comprise distributing the unregulated DC voltage to a plurality of charging poles of a charging station, wherein the steps of converting the unregulated DC voltage using the buck converter and converting the regulated DC voltage using the LLC resonant converter are performed at each of the plurality of charging poles.

These and other features of the present disclosure will become more apparent from the following description of the illustrative embodiments.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
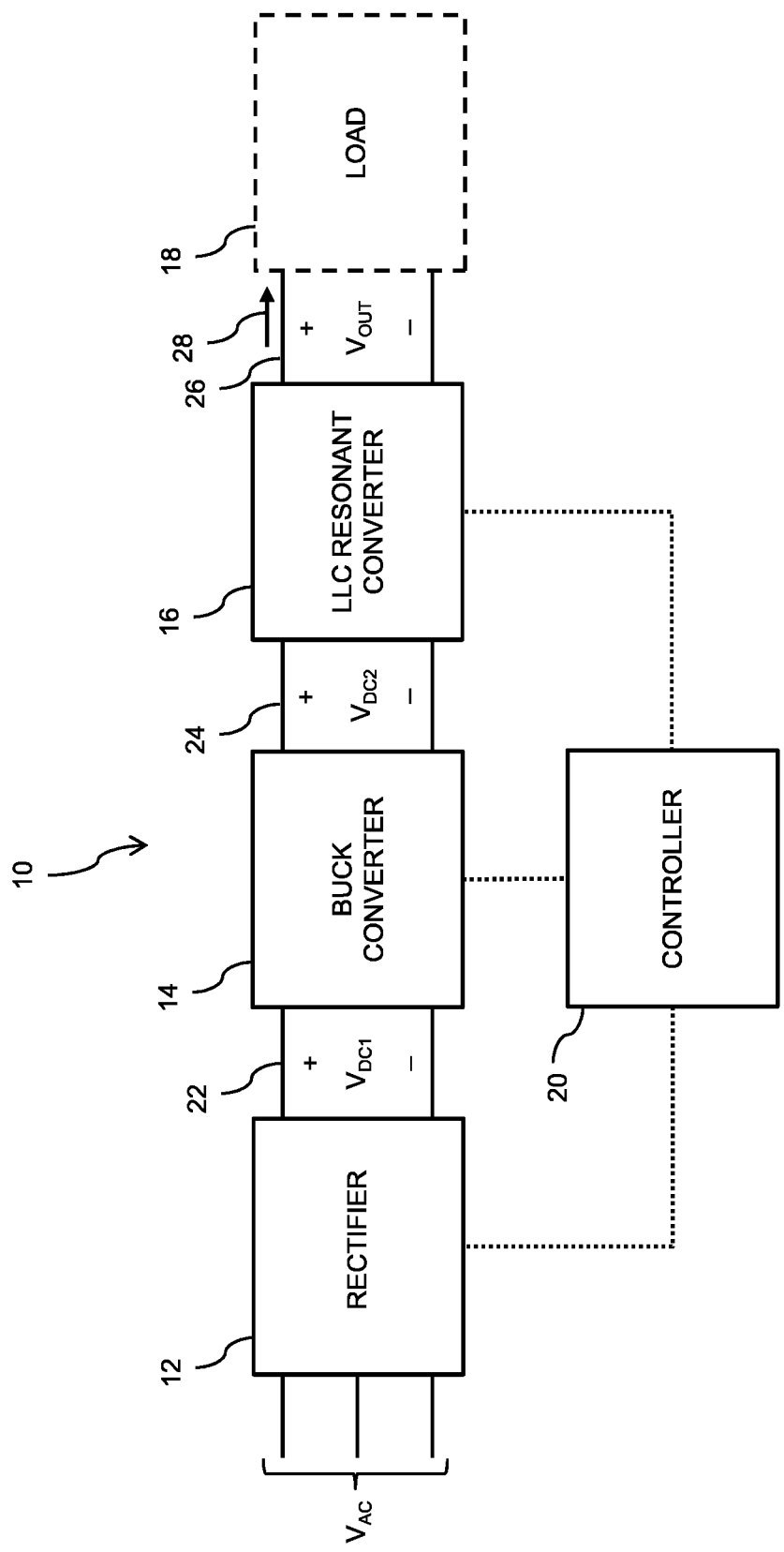
FIG. 1 is a simplified block diagram of one illustrative embodiment of a three-stage power converter according to the present disclosure.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, one illustrative embodiment of a three-stage power converter 10 according to the present disclosure is shown as a simplified block diagram. A rectifier 12 serves as a first stage of the power converter 10, while a buck converter 14 serves as a second stage of the power converter 10, and a LLC resonant converter 16 serves as a third stage of the power converter 10. In the illustrative embodiment, the power converter 10 also includes a controller 20 that is able to, among other things, control the switching of active devices in each of the rectifier 12, the buck converter 14, and the LLC resonant converter 16 to control the operation of the power converter 10. It will be appreciated that the power converter 10 may comprise additional components, which are not shown in FIG. 1 so as not to obscure the disclosure.

The three-stage power converter 10 is configured to provide power to a load 18. By way of example, the power converter 10 may be used to supply a direct-current (DC) charging current to a battery 18. The three-stage power converter 10 of the present disclosure is particularly useful a power module in electrical vehicle charging infrastructure to charge the batteries of electrical vehicles, but its use is not limited such applications.

Figure 2:
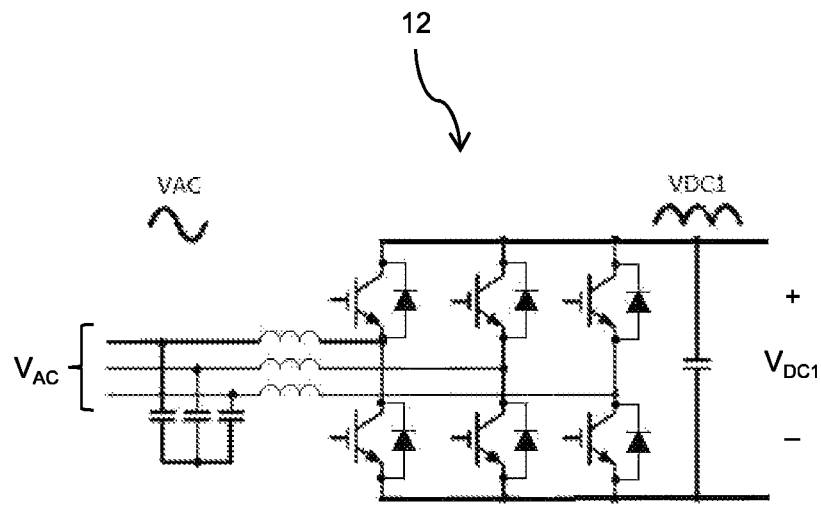
FIG. 2 is a circuit diagram of one illustrative embodiment of an active rectifier that may be used in a first stage of the three-stage power converter of FIG. 1.

The first stage of the power converter 10 includes the rectifier 12. The rectifier 12 is illustratively embodied as a three-phase active rectifier 12 including a number of active devices. The active devices may be embodied as metal-oxide-silicon field-effect transistors (MOSFETs) or as insulated gate bi-polar transistors (IGBTs). The active devices may have voltage ratings of 1000-1200V. A circuit diagram of one example of a three-phase active rectifier 12 with six IGBTs that may be used in the first stage of the power converter 10 is shown in FIG. 2. It is contemplated that the rectifier 12 may alternatively be embodied as any circuit capable of performing the functions described herein.

The rectifier 12 has an input that receives three-phase alternating-current (AC), for example, AC power from an electrical grid. In the illustrative embodiment, the active devices of the rectifier 12 switch at appropriate intervals and frequencies to generate unregulated DC voltage. For instance, during each part of the line cycle, one or two of the three phase legs of rectifier 12 may be switched at high frequency such that the input current in all three lines is controlled to be generally sinusoidal (at most times, only one of the three phase legs will be switching at high frequency; but, during transition periods in the line cycle, two of the three phase legs may be switching at high frequency). In the embodiment shown in FIG. 2, the rectifier 12 generates unregulated DC voltage that has a dominant six pulse ripple (with other frequency components). This unregulated DC voltage is provided at an output of the rectifier 12, which is coupled to a DC bus 22 of the power converter 10.

Figure 3:
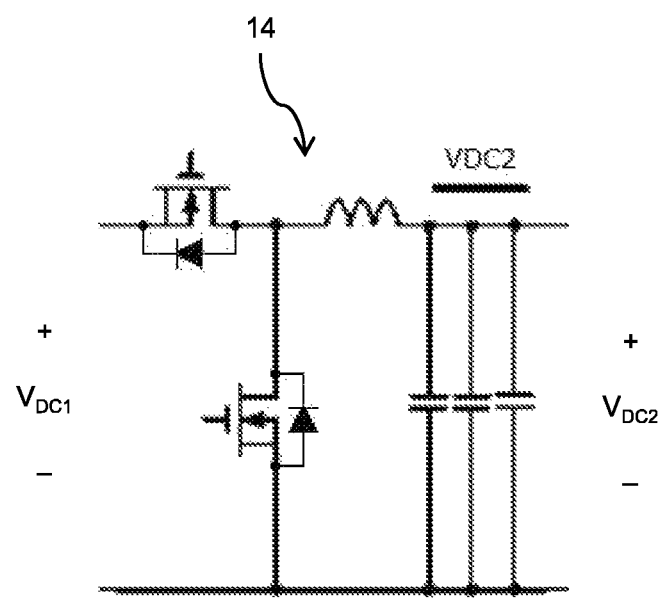
FIG. 3 is a circuit diagram of one illustrative embodiment of a synchronous buck converter that may be used in a second stage of the three-stage power converter of FIG. 1.

The second stage of the power converter 10 includes the buck converter 14. The buck converter 14 is illustratively embodied as a synchronous buck converter 14 including a number of active devices. The active devices may be embodied as silicon carbide (SiC) MOSFETs and may have voltage ratings of 1000-1200V. A circuit diagram of one example of a synchronous buck converter 14 with two SiC MOSFETs that may be used in the second stage of the power converter 10 is shown in FIG. 3 (the anti-parallel diodes shown in FIG. 3 may be optionally omitted). It is contemplated that the buck converter 14 may alternatively be embodied as any circuit capable of performing the functions described herein. By way of example, in some embodiments, the buck converter 14 may be embodied as a three-level buck converter or two cascaded buck converters, using active devices with voltage ratings around 650V (e.g., Gallium Nitride High Electron Mobility Transistors).

The input of the buck converter 14 is coupled to the DC bus 22, from which the buck converter 14 receives unregulated DC voltage. The active devices of the buck converter 14 are switched in a controlled manner (e.g., by the controller 20) to smooth the received DC voltage and generate regulated DC voltage. This regulated DC voltage is provided at an output of the buck converter 14, which is coupled to a DC bus 24 of the power converter 10. In the illustrative embodiment, the active devices of the buck converter 14 may be switched at various duty cycles, within a range of duty cycles, in order to adjust a level of the regulated DC voltage generated by the buck converter 14. For example, increasing the duty cycles of the active devices of the buck converter 14 may cause the buck converter to output a higher level of regulated DC voltage onto the DC bus 24. It is contemplated that the buck converter 14 could be operated in a Continuous Conduction Mode (CCM), a Discontinuous Conduction Mode (DCM), or a Boundary Conduction Mode (BCM). Typically, operating in DCM and BCM will give the lowest switching losses from semiconductors in the buck converter 14.

Figure 4:
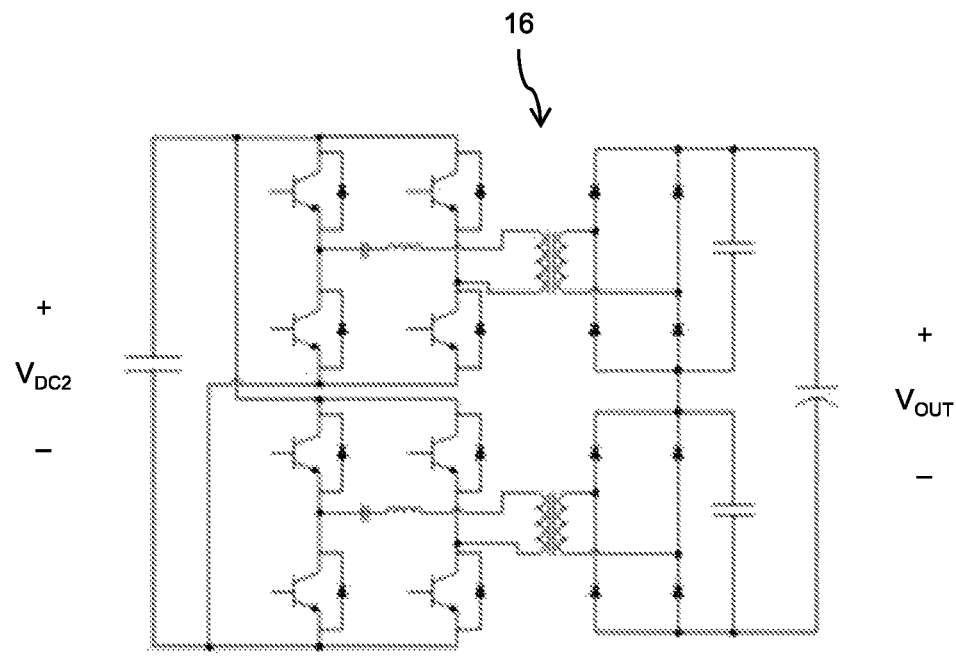
FIG. 4 is a circuit diagram of one illustrative embodiment of an LLC resonant converter, specifically an input-parallel output-series (IPOS) LLC converter, that may be used in a third stage of the three-stage power converter of FIG. 1.
Figure 5:
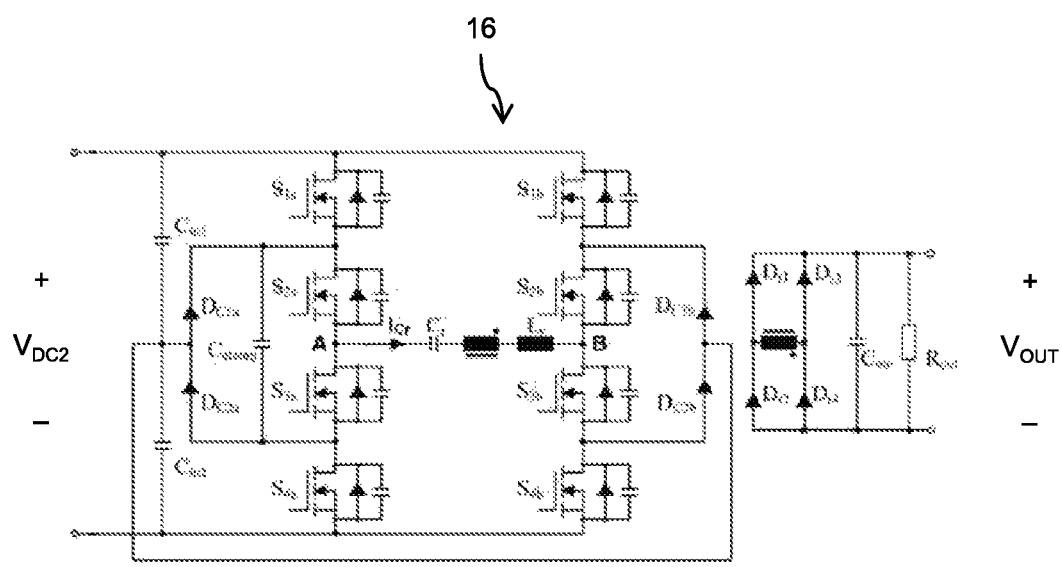
FIG. 5 is a circuit diagram of another illustrative embodiment of an LLC resonant converter, specifically a three-level LLC converter, that may be used in the third stage of the three-stage power converter of FIG. 1.

The third stage of the power converter 10 includes the LLC resonant converter 16. The LLC resonant converter 16 is illustratively embodied as an isolated DC-DC converter that includes a number of active devices that are switched at a fixed frequency at or near the resonant frequency of the LLC resonant converter 16 to maintain high efficiency. The active devices may be embodied as MOSFETs or IGBTs. A circuit diagram of one example of an LLC resonant converter 16 with eight IGBTs, arranged in an input-parallel output-series (IPOS) LLC converter configuration, that may be used in the third stage of the power converter 10 is shown in FIG. 4. Another example an LLC resonant converter 16 that may be used in the third stage of the power converter 10 is shown in FIG. 5, which illustrates a circuit diagram of three-level LLC converter utilizing eight MOSFETs. It is contemplated that the LLC resonant converter 16 may alternatively be embodied as any circuit capable of performing the functions described herein.

The input of the LLC resonant converter 16 is coupled to the DC bus 24, from which the LLC resonant converter 16 receives regulated DC voltage. It is also contemplated that, in alternative embodiments, the buck converter 14 and the LLC resonant converter 16 could be in a multi-phase interleaved configuration to reduce the passive component size. The active devices of the LLC resonant converter 16 are switched in a controlled manner (e.g., by the controller 20) to provide gain (at one of a multiple discrete gain levels, as described further below) to the regulated DC voltage received from DC bus 24 and generate a DC charging current 28. This DC charging current 28 is provided at an output of the LLC resonant converter 16, which is coupled to a DC bus 26 of the power converter 10. A load 18 (e.g., a battery) may be electrically coupled to the DC bus 26 of the power converter 10 to receive the DC charging current 28.

In the illustrative embodiment, the LLC resonant converter 16 is operable in multiple modes to provide multiple, discrete gain levels (i.e., voltage-conversion ratios). In each of these multiple operational modes, the LLC resonant converter 16 is operated at or near its resonant frequency. By way of contrast, conventional power converters adjust gain by changing the switching frequency of the LLC converter, causing the efficiency of the converter to drop dramatically when the LLC converter is operated away from resonance. While the LLC resonant converter 16 of the present disclosure is operated at a fixed (resonant) frequency, the gain of the LLC resonant converter 16 may be switched between multiple, discrete levels by modulating each bridge (or sub-module) of the LLC resonant converter 16 to operate either as a half-bridge, as a full-bridge, or not at all. Where the LLC resonant converter 16 includes two bridges (like the LLC resonant converters 16 shown in FIGS. 4 and 5), four different combinations or operational modes are possible, providing four discrete gain levels.

Figure 6A:
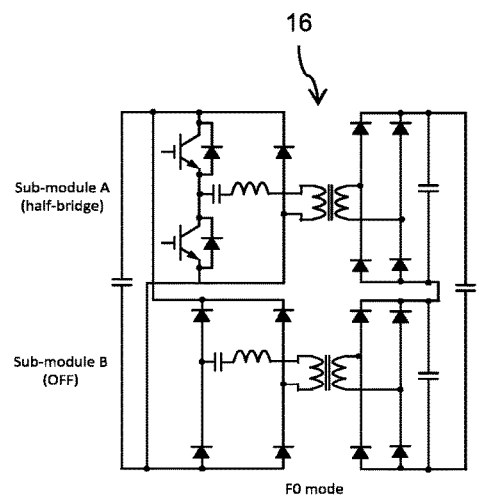
FIGS. 6A-D are operational circuit diagrams illustrating four different operational modes of the IPOS LLC converter of FIG. 4.
Figure 6B:
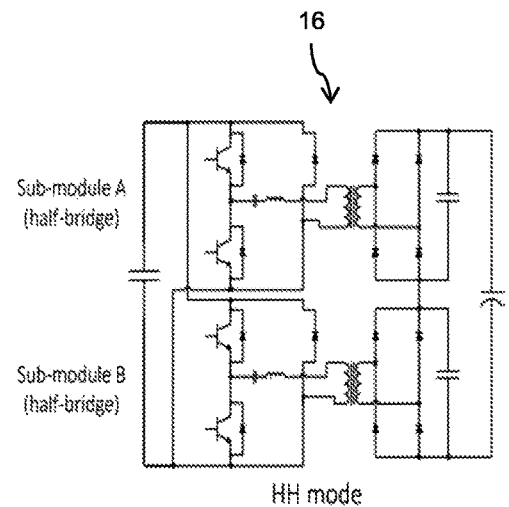
Figure 6C:
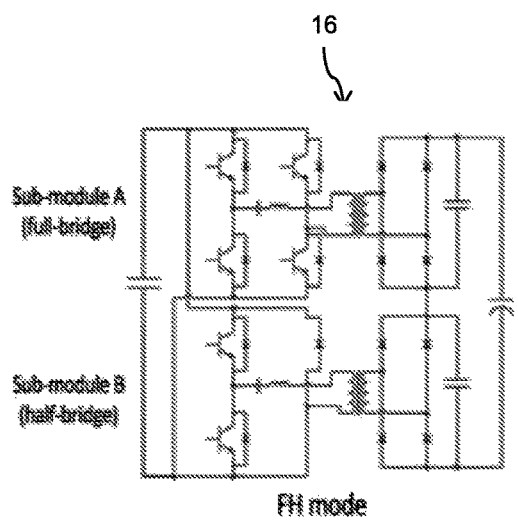
Figure 6D:
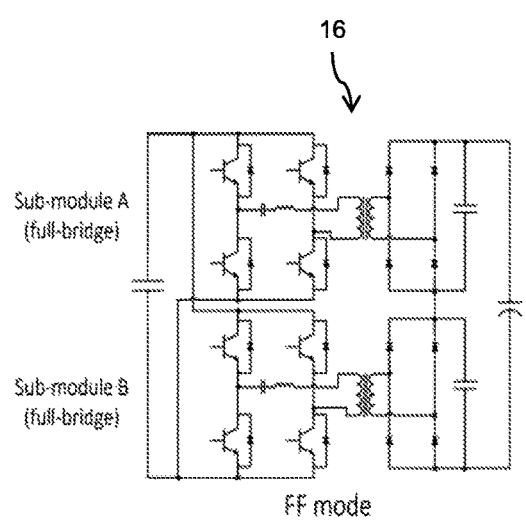

This functionality can be illustrated using the IPOS LLC converter 16 of FIG. 4, which includes two bridges and, thus, four possible operational modes according to the present disclosure. FIGS. 6A, 6B, 6C, and 6D each illustrate one of the four different operational modes of the IPOS LLC converter 16. In each of FIGS. 6A-D, only the active devices that are being switched (e.g., by the controller 20) are shown in the operational circuit diagrams. In other words, in each of FIGS. 6A-D, the active devices that are turned completely off for that operational mode are removed from the drawing for clarity. FIG. 6A illustrates a first operational mode of the IPOS LLC converter 16, in which a sub-module A of the LLC resonant converter 16 operates as a half-bridge converter and a sub-module B of the LLC resonant converter 16 is inactive (i.e., completely off). In this first operational mode, the LLC resonant converter 16 has a gain (i.e., voltage conversion ratio) of 0.5. FIG. 6B illustrates a second operational mode of the LLC resonant converter 16 in which the sub-module A operates as a half-bridge converter and the sub-module B operates as a half-bridge converter. In this second operational mode, the LLC resonant converter 16 has a gain (i.e., voltage conversion ratio) of 1.0. FIG. 6C illustrates a third operational mode of the LLC resonant converter 16 in which the sub-module A operates as a full-bridge converter and the sub-module B operates as a half-bridge converter. In this third operational mode, the LLC resonant converter 16 has a gain (i.e., voltage conversion ratio) of 1.5. FIG. 6D illustrates a fourth operational mode of the LLC resonant converter 16 in which the sub-module A operates as a full-bridge converter and the sub-module B operates as a full-bridge converter. In this fourth operational mode, the LLC resonant converter 16 has a gain (i.e., voltage conversion ratio) of 2.0.

The three-stage architecture of the power converter 10 together with the discretely switchable gain levels of the third stage (i.e., the LLC resonant converter 16) allow the power converter 10 to achieve a wide output voltage range with high efficiency and low cost. The high efficiency of the power converter 10 results from the negligible switching losses present in the rectifier 12 and the LLC resonant converter 16, as well as the fact that the buck converter 14 can be designed, by proper component selection, with a high efficiency at relatively low cost, because the discretely switchable gain levels of the LLC resonant converter 16 allow the output range (and, consequently, the duty cycle range) of the buck converter 14 to remain relatively narrow (allowing the buck converter 14 to operate more efficiently also). The three-stage architecture of the presently disclosed power converter 10 also provides flexibility with regard to the selection of power semiconductor (active) devices. By way of example, for a low-cost solution, the rectifier 12 and the LLC resonant converter 16 could use silicon IGBTs, while the buck converter 14 could employ a three-level topology with silicon MOSFETs. On the other hand, for a high-performance configuration, all the semiconductors could be embodied as SiC active devices. A hybrid solution, in which the buck converter 14 utilized SiC active devices, while the rectifier 12 and the LLC resonant converter 16 utilized silicon active devices, is also contemplated as a relatively economical and high-performance option.

As noted above, the power converter 10 may also include one or more controllers 20 to control the switching of active devices in any of the rectifier 12, the buck converter 14, and the LLC resonant converter 16 in order to control the operation of the power converter 10. The controller(s) 20 may be embodied as any type of control circuitry capable of generating switching signals to control the active devices of the power converter 10. For example, the controller(s) 20 may be embodied as one or more processor(s), microcontroller(s), or other processing/controlling circuits, including, but not limited to field programmable gate arrays (FPGAs), application specific integrated circuit (ASICs), reconfigurable hardware or hardware circuitry, or other specialized hardware. In the illustrative embodiment, the controller 20 is configured to control the LLC resonant converter 16 to operate in one of its multiple modes and to control a duty cycle of the buck converter 14 based upon the selected operational mode of the LLC resonant converter 16 and a desired power level for the DC charging current 28 (one example of such operation is discussed further below with reference to FIG. 7). The controller 20 may also perform power factor correction through regulation of the rectifier 12 and the buck converter 14. It is also contemplated that the controller 20 may perform additional functions related to the power converter 10, such as monitoring the operational status and performance of the power converter 10 and transmitting information regarding the same over a communications network (e.g., to a user or manager of the power converter 10).

Figure 7:
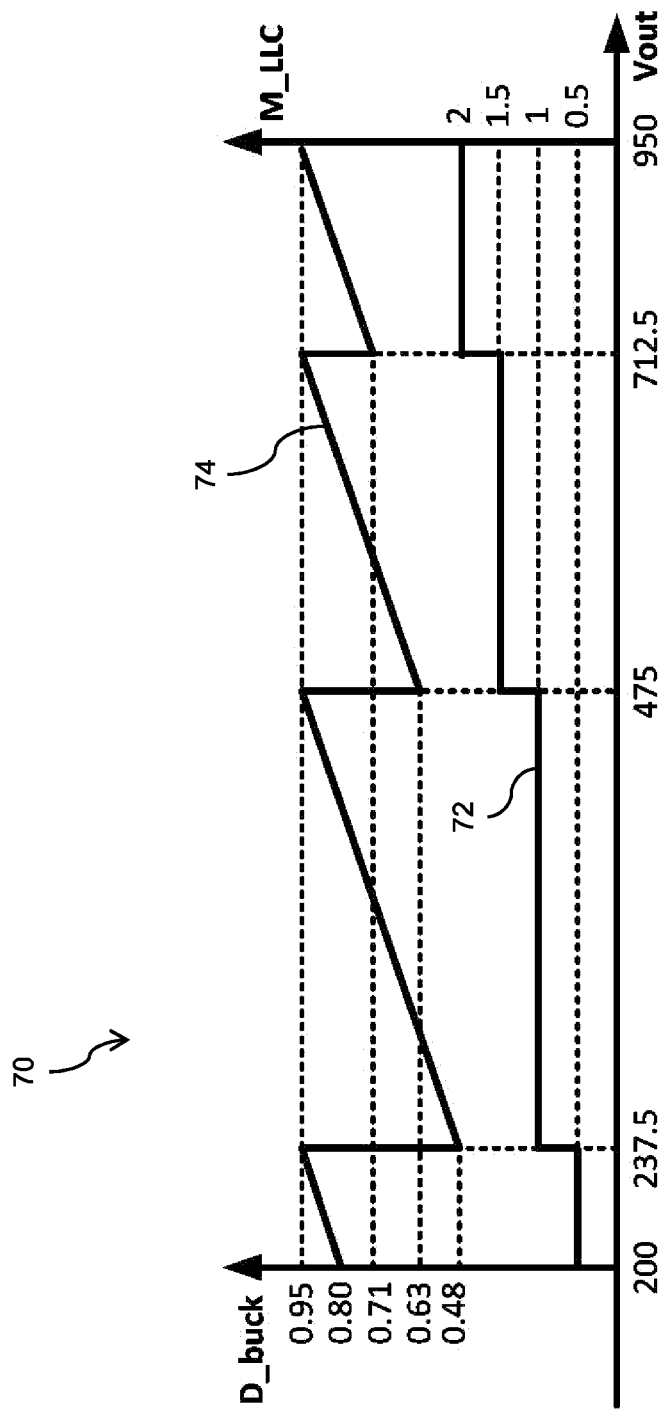
FIG. 7 is a graph illustrating the interaction of the second and third stages of the three-stage power converter of FIG. 1.

Referring now to FIG. 7, the graph 70 illustrates on example of the interaction of the second and third stages (i.e., the buck converter 14 and the LLC resonant converter 16) of the three-stage power converter 10. The example illustrated by graph 70 assumes an AC input voltage ($V_{AC}$ received by the rectifier 12) of 380 VAC, with 20% fluctuation, and an output voltage range ($V_{OUT}$ on DC bus 26) of 200-950 VDC. As such, the minimum unregulated DC voltage ($V_{DC1}$ on DC bus 22) is 650V with six pulse ripple. As discussed above, the voltage gain of the LLC resonant converter 16 ("M_LLC" in graph 70) is 0.5 at the lowest output voltage (Vout=200 VDC) and 2.0 at the highest output voltage (Vout=950 VDC) (with intermediate steps of 1.0 and 1.5, as illustrated by trace 72 in graph 70). Therefore, the turns-ratio, N, of the LLC transformer can be calculated and equals to 1.37. The duty cycle of the buck converter 14 ("D_buck" in graph 70) and values of the regulated DC voltage ($V_{DC2}$ on DC bus 24) can be calculated based on the gain level of the LLC resonant converter 16. In order to more clearly explain the operation of the power converter 10, it is assumed that the unregulated DC voltage ($V_{DC1}$ on DC bus 22) has a constant value in FIG. 7. In reality, however, the unregulated DC voltage ($V_{DC1}$ on DC bus 22) has a six pulse ripple and, thus, the duty cycle of the buck converter 14 ("D_buck") will have same six pulse ripple as well.

The buck converter 14 regulates its output voltage ($V_{DC2}$ provided on DC bus 24) to ensure the output voltage ($V_{OUT}$ provided on DC bus 26) is smoothly transitioned when the LLC resonant converter 16 changes from one operational mode to another. First, the initial gain of the LLC resonant converter 16 is set to 0.5, as illustrated by trace 72 in graph 70. The duty cycle of the buck converter 14 is increased from 0.80 to 0.95 to increase the output voltage ($V_{OUT}$ provided on DC bus 26) from 200V to 237.5V, as illustrated by trace 74 in graph 70. Next, the LLC resonant converter 16 changes its voltage gain to 1.0, as illustrated by trace 72, and the buck converter 14 regulates its duty cycle from 0.48 to 0.95, as illustrated by trace 74, in order to provide output voltages from 237.5V to 475V. Then, the LLC resonant converter 16 changes its gain to 1.5, as illustrated by trace 72, and the buck converter 14 regulates its duty cycle from 0.63 to 0.95, as illustrated by trace 74, to provide output voltages from 475V to 712.5V. Finally, the LLC resonant converter 16 changes its gain to 2.0, as illustrated by trace 72, and the buck converter 14 regulates its duty cycle from 0.71 to 0.95, as illustrated by trace 74, in order to provide output voltages from 712.5V to 950V. It will be appreciated that the values shown in FIG. 7 are exemplary in nature and not limiting.

Figure 8:
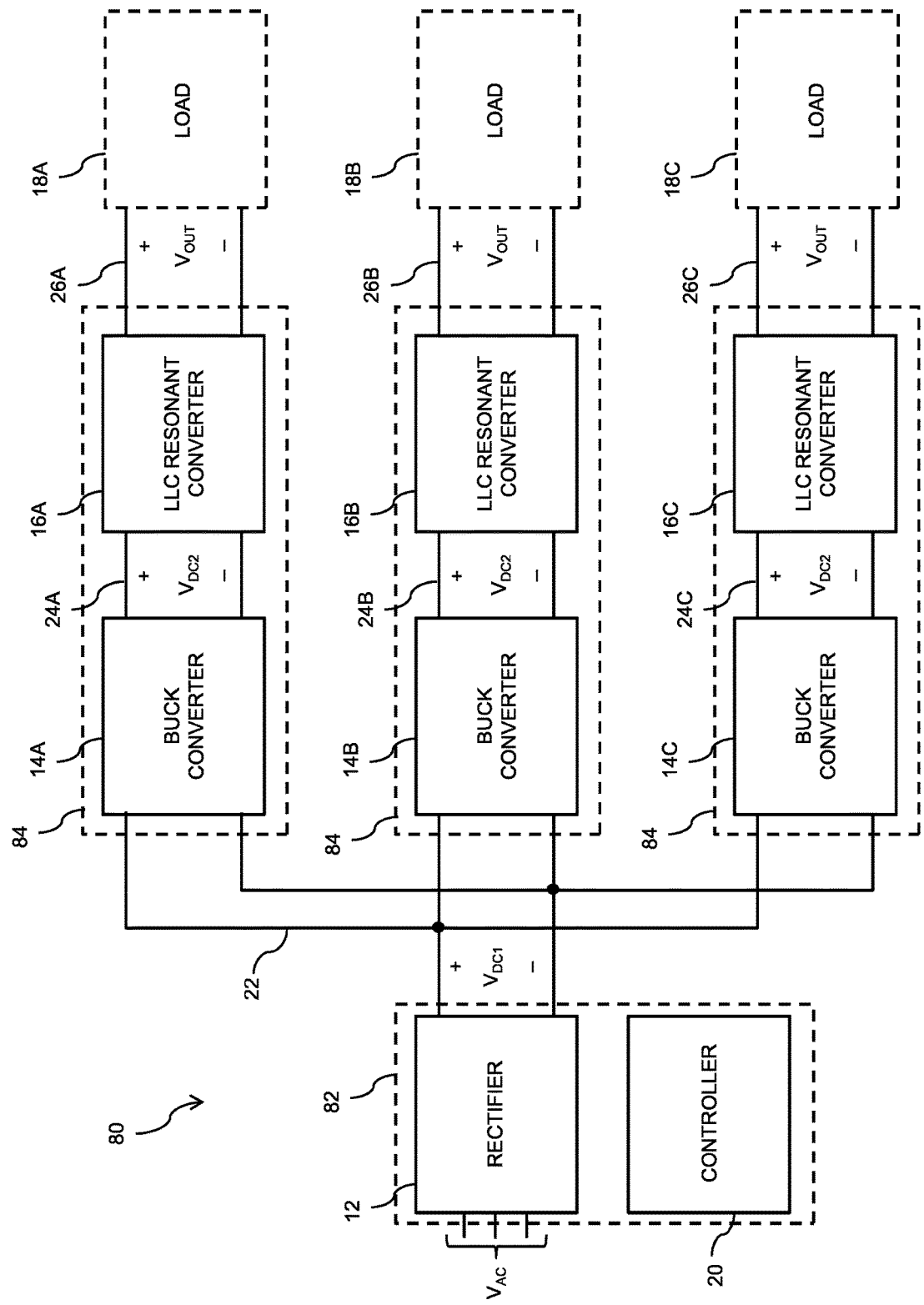
FIG. 8 is a simplified block diagram of one illustrative embodiment of an electrical vehicle charging station according to the present disclosure.

Referring now to FIG. 8, one illustrative embodiment of an electric vehicle charging station 80 according to the present disclosure is shown as a simplified block diagram. It will be appreciated that the electric vehicle charging station 80 includes many similar components to the three-stage power converter 10. The description of those components above (in the context of power converter 10) is equally applicable to the similar components of the electric vehicle charging station 80, except as discussed below.

The electric vehicle charging station 80 includes a central container 82 and a plurality of charging poles 84. While FIG. 8 illustratively includes three charging poles 84A, 84B, 84C, it will be appreciated that any number of charging poles 84 could be implemented in the electric vehicle charging station 80 with appropriate configuration of the system. Each of the charging poles 84A, 84B, 84C is designed to electrically couple to a respective load 18A, 18B, 18C (e.g., a battery of an electric vehicle) in order to supply a DC charging current 28 to the respective load 18A, 18B, 18C. Each of the charging poles 84 includes a buck converter 14 and an LLC resonant converter 16, which operate in the manner described above. One, centralized rectifier 12 is located at the central container 82. The DC bus 22 connects the rectifier 12 to each of the buck converters 14A, 14B, 14C located at the respective charging poles 84A, 84B, 84C. As such, the unregulated DC power provided by the rectifier 12 is distributed to each of the buck converters 14A, 14B, 14C via the DC bus 22.

In the illustrative embodiment of FIG. 8, the controller 20 is also located at the central container 82. In this embodiment, the controller 20 is communicatively coupled to each of the charging poles 84A, 84B, 84C to control the components located at the charging poles 84A, 84B, 84C (as well as the rectifier 12). It is contemplated that, in other embodiments, the electric vehicle charging station 80 may utilize multiple controllers 20, including controllers 20 located at each of the charging poles 84A, 84B, 84C to effect local control of the components located at each charging pole 84A, 84B, 84C.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A three-stage power converter comprising:
a rectifier having (i) an input to receive three-phase alternating-current (AC) and (ii) an output coupled to a first direct-current (DC) bus;
a buck converter having (i) an input coupled to the first DC bus and (ii) an output coupled to a second DC bus; and
an LLC resonant converter having (i) an input coupled to the second DC bus and (ii) an output to provide a DC charging current to a battery, wherein the LLC resonant converter is operable in a plurality of modes to provide a plurality of discrete gain levels, wherein the LLC resonant converter is (i) an input-parallel output-series (IPOS) LLC converter or (ii) a three-level LLC converter, and wherein the plurality of modes of the LLC resonant converter comprises:
a first mode in which a first sub-module of the LLC resonant converter operates as a half-bridge converter and a second sub-module of the LLC resonant converter is inactive;
a second mode in which the first sub-module of the LLC resonant converter operates as a half-bridge converter and the second sub-module of the LLC resonant converter operates as a half-bridge converter;
a third mode in which the first sub-module of the LLC resonant converter operates as a full-bridge converter and the second sub-module of the LLC resonant converter operates as a half-bridge converter; and
a fourth mode in which the first sub-module of the LLC resonant converter operates as a full-bridge converter and the second sub-module of the LLC resonant converter operates as a full-bridge converter.

2. The three-stage power converter of claim 1, wherein the rectifier comprises a plurality of active devices configured to be switched to convert the three-phase AC into unregulated DC voltage.

3. The three-stage power converter of claim 1, wherein the LLC resonant converter operates at or near its resonant frequency in each of the plurality of modes.

4. The three-stage power converter of claim 1, wherein the LLC resonant converter is an input-parallel output-series (IPOS) LLC converter.

5. The three-stage power converter of claim 1, wherein the LLC resonant converter is a three-level LLC converter.

6. The three-stage power converter of claim 1, wherein the buck converter is operable across a range of duty cycles to adjust a voltage level supplied to the second DC bus by the buck converter.

7. The three-stage power converter of claim 1, further comprising a controller configured to (i) control the LLC resonant converter to operate in a selected one of the plurality of modes and (ii) control a duty cycle of the buck converter based upon the selected mode of the LLC resonant converter and a desired power level for the DC charging current.

8. An electrical vehicle charging station comprising:
a rectifier having (i) an input to receive three-phase alternating-current (AC) and (ii) an output coupled to a first direct-current (DC) bus;
a plurality of charging poles, each of the plurality of charging poles comprising:
a buck converter having (i) an input coupled to the first DC bus and (ii) an output coupled to a second DC bus; and
an LLC resonant converter having (i) an input coupled to the second DC bus and (ii) an output to provide a DC charging current to a battery, wherein the LLC resonant converter is operable in a plurality of modes to provide a plurality of discrete gain levels; and
one or more controllers configured to:
determine a desired output voltage level at each of the plurality of charging poles between 200 volts and 950 volts, wherein the desired output voltage of each of the plurality of charging poles is independent of the desired output voltage level of each other charging pole of the plurality of charging poles; and
determine, for each of the plurality of charging stations and based on the corresponding desired output voltage level, a duty cycle for the corresponding buck converter and a selected mode of the plurality of modes for the corresponding LLC resonant converter,
wherein the one or more controllers are able to control each of the plurality of charging poles to provide a voltage output anywhere in the range of 200-950 volts.

9. The electrical vehicle charging station of claim 8, wherein the LLC resonant converter of each charging pole operates at or near its resonant frequency in each of its plurality of modes.

10. The electrical vehicle charging station of claim 8, wherein the buck converter of each charging pole is operable across a range of duty cycles to adjust a voltage level supplied to the second DC bus of that charging pole by the buck converter.

11. The electric vehicle charging station of claim 8, wherein the plurality of modes of the LLC resonant converter of each of the plurality of charging poles comprises:
- a first mode in which a first sub-module of the LLC resonant converter operates as a half-bridge converter and a second sub-module of the LLC resonant converter is inactive;
- a second mode in which the first sub-module of the LLC resonant converter operates as a half-bridge converter and the second sub-module of the LLC resonant converter operates as a half-bridge converter;
- a third mode in which the first sub-module of the LLC resonant converter operates as a full-bridge converter and the second sub-module of the LLC resonant converter operates as a half-bridge converter; and
- a fourth mode in which the first sub-module of the LLC resonant converter operates as a full-bridge converter and the second sub-module of the LLC resonant converter operates as a full-bridge converter.

12. A method of operating a three-stage power converter, the method comprising:
- rectifying alternating-current (AC) power, using a rectifier of the three-stage power converter, to provide unregulated direct-current (DC) voltage;
- converting the unregulated DC voltage, using a buck converter of the three-stage power converter, to provide regulated DC voltage; and
- converting the regulated DC voltage, using an LLC resonant converter of the three-stage power converter operating in a selected one of a plurality of available modes, to provide a DC charging current to a battery, wherein each of the plurality of available modes of the LLC resonant converter provides one of a plurality of discrete gain levels, wherein the LLC resonant converter is (i) an input-parallel output-series (IPOS) LLC converter or (ii) a three-level LLC converter, and wherein the plurality of available modes comprises:
  - a first mode in which a first sub-module of the LLC resonant converter operates as a half-bridge converter and a second sub-module of the LLC resonant converter is inactive;
  - a second mode in which the first sub-module of the LLC resonant converter operates as a half-bridge converter and the second sub-module of the LLC resonant converter operates as a half-bridge converter;
  - a third mode in which the first sub-module of the LLC resonant converter operates as a full-bridge converter and the second sub-module of the LLC resonant converter operates as a half-bridge converter; and
  - a fourth mode in which the first sub-module of the LLC resonant converter operates as a full-bridge converter and the second sub-module of the LLC resonant converter operates as a full-bridge converter.

13. The method of claim 12, wherein the unregulated DC voltage has a dominant six pulse ripple.

14. The method of claim 12, wherein the LLC resonant converter operates at or near its resonant frequency in each of the plurality of available modes.

15. The method of claim 12, wherein converting the unregulated DC voltage using the buck converter comprises controlling a duty cycle of the buck converter based upon the selected mode of the LLC resonant converter and a desired power level for the DC charging current.

16. The method of claim 15, further comprising controlling the LLC resonant converter to operate in another of the plurality of available modes to adjust a power level of the DC charging current.

17. The method of claim 16, further comprising modifying the duty cycle of the buck converter to further adjust the power level of the DC charging current.

18. The method of claim 12, further comprising distributing the unregulated DC voltage to a plurality of charging poles of a charging station, wherein the steps of converting the unregulated DC voltage using the buck converter and converting the regulated DC voltage using the LLC resonant converter are performed at each of the plurality of charging poles.

* * * * *